(12) United States Patent
Pascual et al.

(10) Patent No.: US 9,788,558 B2
(45) Date of Patent: Oct. 17, 2017

(54) READY TO DRINK BEVERAGES AND METHODS OF MAKING THEREOF

(71) Applicant: NESTEC S.A., Vevey (CH)

(72) Inventors: Teresita Bautista Pascual, Marysville, OH (US); Alexander A. Sher, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/398,771

(22) PCT Filed: May 5, 2013

(86) PCT No.: PCT/EP2013/059321
§ 371 (c)(1),
(2) Date: Nov. 4, 2014

(87) PCT Pub. No.: WO2013/164485
PCT Pub. Date: Nov. 7, 2013

(65) Prior Publication Data
US 2015/0132467 A1    May 14, 2015

Related U.S. Application Data

(60) Provisional application No. 61/642,936, filed on May 4, 2012, provisional application No. 61/651,249, filed on May 24, 2012.

(51) Int. Cl.
| | | |
|---|---|---|
| A23G 1/56 | (2006.01) |
| A23L 1/059 | (2006.01) |
| A23L 1/0532 | (2006.01) |
| A23G 1/44 | (2006.01) |
| A23L 1/0534 | (2006.01) |
| A23L 2/38 | (2006.01) |
| A23L 2/52 | (2006.01) |
| A23L 2/66 | (2006.01) |
| A23L 29/256 | (2016.01) |
| A23L 29/262 | (2016.01) |
| A23L 29/294 | (2016.01) |

(52) U.S. Cl.
CPC .......... *A23G 1/56* (2013.01); *A23G 1/44* (2013.01); *A23L 2/38* (2013.01); *A23L 2/52* (2013.01); *A23L 2/66* (2013.01); *A23L 29/256* (2016.08); *A23L 29/262* (2016.08); *A23L 29/294* (2016.08); *A23V 2002/00* (2013.01)

(58) Field of Classification Search
CPC ..................................................... A23C 11/02
See application file for complete search history.

(56) References Cited

U.S. PATENT DOCUMENTS

| | | | | |
|---|---|---|---|---|
| 5,670,344 A * | 9/1997 | Mehansho | ............... | A23G 1/56 |
| | | | | 426/593 |
| 6,455,082 B1 * | 9/2002 | Sher | ..................... | A23C 9/1522 |
| | | | | 426/573 |
| 6,468,576 B1 * | 10/2002 | Sher | ....................... | A23G 9/045 |
| | | | | 426/330.3 |
| 7,645,470 B2 * | 1/2010 | Walker | ..................... | A23L 2/52 |
| | | | | 426/580 |
| 2004/0228954 A1 * | 11/2004 | Tejayadi | ............... | A23C 9/1544 |
| | | | | 426/521 |
| 2013/0150462 A1 * | 6/2013 | Tan | ............................ | C08L 1/04 |
| | | | | 514/781 |
| 2014/0017356 A1 * | 1/2014 | Te Biesebeke | .......... | A23G 1/56 |
| | | | | 426/28 |

FOREIGN PATENT DOCUMENTS

WO    WO 2010091871 A1 *    8/2010    ............ A23C 11/00

* cited by examiner

*Primary Examiner* — Nikki H Dees
*Assistant Examiner* — Amber Cox
(74) *Attorney, Agent, or Firm* — K&L Gates LLP

(57) ABSTRACT

Ready to drink beverages are provided. In a general embodiment, the present disclosure provides a ready to drink high-protein chocolate beverage including a protein component, a cocoa component, and a stabilizing system. The protein component may be present in an amount from about 4% to about 12% by weight of the beverage. The stabilizing system includes sodium hexamethaphosphate and a hydrocolloid component.

10 Claims, No Drawings

READY TO DRINK BEVERAGES AND METHODS OF MAKING THEREOF

CROSS REFERENCE TO RELATED APPLICATIONS

The present application is a National Stage of International Application No. PCT/EP2013/059321, filed on May 5, 2013, which claims priority to U.S. Provisional Patent Application No. 61/642,936, filed May 4, 2012 and U.S. Provisional Patent Application No. 61/651,249, filed May 24, 2012, the entire contents of which are being incorporated herein by reference.

BACKGROUND

The present disclosure generally relates to compositions. More specifically, the present disclosure is directed to ready to drink ("RTD") beverages.

There are many types of compositions currently on the market. The compositions can be targeted toward certain consumer types, for example, young, elderly, athletic, etc., based on the specific ingredients of the composition. The compositions can also be formulated based on the certain physiological conditions that the compositions are intended to treat or improve, or may be based on desired physical or organoleptic properties of the compositions.

Chocolate beverages can be in liquid or powder forms. The chocolate beverages market is increasing with RTD beverages growing faster than the alternative powder-based beverages. One of the disadvantages of using powder form includes difficulties in dissolving the powder during hydration and the possibility of having a non-homogeneous beverage or a sedimented beverage. RTD chocolate beverages can overcome the issues associated with powder forms. Addition of proteins and stabilizers to liquid beverages generally leads to significant increase of the beverage viscosity which makes the beverage undesirable for consumption, and also may lead to physico-chemical instability issues such as age gelation and phase separation. Among RTD beverages, there are beverages in extended shelf life ("ESL") and aseptic form. ESL beverages generally have shorter shelf lives than aseptic beverages and also need to be stored at refrigeration temperatures.

A desired chocolate beverage should be shelf-stable during storage without phase separation, creaming, gelation and sedimentation, and retain a constant viscosity over time. Because emulsions and suspensions are thermodynamically unstable, there are challenges in overcoming physico-chemical instability issues associated with dairy-based chocolate RTD beverages (e.g., which contain proteins, carbohydrates, fat, insoluble materials such as cocoa, etc.) for long storage time, especially at elevated temperatures (e.g., about 30° C. or above).

It is desirable to have a high-protein aseptic, shelf-stable RTD dairy-based chocolate beverage. Proteins are essential for the normal growth and development of humans. However, the addition of proteins to beverages can create a number of issues. In particular, for high-protein beverages containing insoluble particles such as cocoa, there are a number of instability issues during storage. Previously tested beverages with high protein levels have had undesirably high viscosity, unpleasant texture and mouthfeel, and syneresis or coagulation. Another issue is the precipitation of the insoluble cocoa particles during storage. These issues increase the longer a beverage is stored, and become more severe at elevated temperatures (such as about 30° C. or above).

These interactions are increased during heat treatment, such as pasteurization or sterilization. Thus, it can be difficult to keep cocoa particles evenly suspended in the beverage without affecting the organoleptic properties of the high-protein beverages, especially during lengthy and/or high temperature storage.

SUMMARY

The present disclosure generally relates to chocolate beverages and high-protein chocolate beverages. The chocolate beverages can be aseptic and ready to drink and have good physico-chemical stability during ambient storage times (e.g., stable for up to 1 month at 38° C.) along with a pleasant mouthfeel. The chocolate beverages can also overcome problems with protein destabilization and phase separation such as sedimentation, syneresis, creaming, viscosity change, age gelation, and other phase separation/instability issues during different storage conditions over the full life of the chocolate beverages.

In a general embodiment, the present disclosure provides a shelf-stable ready to drink beverage including a protein component, a cocoa component, and a stabilizing system. The protein component is present in an amount from about 4% to about 12% by weight of the beverage. The stabilizing system includes sodium hexamethaphosphate and a hydrocolloid component.

In an embodiment, the hydrocolloid component is present in an amount from about 0.115% to about 0.335% by weight of the beverage. The sodium hexamethaphosphate is present in an amount from about 0.015% to about 0.03% by weight of the beverage. The % weights herein are based on the total weight of the beverage unless specified otherwise.

In an embodiment, the hydrocolloid component is selected from the group consisting of microcrystalline cellulose, carboxymethyl cellulose, a carrageenan component, or combinations thereof. The carrageenan component may be selected from the group consisting of kappa carrageenan, lambda carrageenan, iota carrageenan or combinations thereof.

In an embodiment, the weight ratio between the hydrocolloid component to the sodium hexamethaphosphate may range from about 13.8:1 to about 22.3:1. The weight ratio of the microcrystalline cellulose to carboxymethylcellulose may range from about 30:1 to about 4:1. The carrageen component may be present in an amount from about 0.005% to about 0.01% by weight of the beverage.

In an embodiment, the viscosity of the beverage ranges from about 8 to about 15 cP at about 0° C. to about 5° C. (refrigeration temperature).

In an embodiment, the protein component is a dairy protein such as whey protein, casein, or combinations thereof.

In an embodiment, the beverage includes malt extract.

In an alternative embodiment, the present disclosure provides a shelf-stable ready to drink beverage including protein component, a cocoa component, and a stabilizing system. The protein component present is in an amount from about 4% to about 12% by weight of the beverage. The stabilizing system includes sodium hexamethaphosphate and a hydrocolloid component. The stabilizing system is formulated to suspend cocoa powders, provide physic-chemical stability of the RTD beverage and to maintain viscosity of the beverage in a range from about 8 to about 15 cP at about 0° C. to about 5° C. (refrigeration temperature).

In another embodiment, the present disclosure discloses a method for making a high-protein ready to drink beverage, the method including mixing a protein component, a cocoa component, and a stabilizing system comprising sodium hexamethaphosphate and a hydrocolloid component, the stabilizing system formulated to maintain a viscosity of the beverage in a range from about 8 to about 15 cP at about refrigeration temperature, and to prevent sedimentation and other phase separation during storage. In an embodiment, the protein component is present in an amount from about 4% to about 12% by weight of the beverage.

An advantage of the present disclosure to provide an improved ready to drink chocolate beverage that is shelf-stable.

Another advantage of the present disclosure is to provide an improved ready to drink chocolate beverage that has high amounts of protein.

Still another advantage of the present disclosure is to provide a chocolate beverage that does not have stability issues such as protein destabilization, phase separation, sedimentation, syneresis, coagulation, creaming, viscosity change, and age gelation during heat treatment and storage.

Still another advantage of the present disclosure is to provide a high-protein chocolate beverage that maintains a viscosity similar to reconstituted powder in milk, good mouthfeel, body, smooth texture, and good flavor during heat treatment and the shelf-life.

Additional features and advantages are described herein, and will be apparent from the following Detailed Description.

DETAILED DESCRIPTION

The present disclosure relates to liquid chocolate beverages and high-protein chocolate beverages. The liquid chocolate beverages can be aseptic and shelf-stable dairy-based cocoa-containing RTD beverages, for example, formed by the interaction of dairy proteins, cocoa, carbohydrates, and fats, and stabilized by the use of a complex stabilizing system containing specific combinations of sodium hexamethaphosphate and a hydrocolloid component. The chocolate beverages can maintain a low viscosity throughout their shelf-life.

Applicants have surprisingly found a unique combination of components for a stabilizing system that can provide aseptic RTD beverages with good physico-chemical stability during heat treatment and storage while also providing good mouthfeel and a low viscosity. The stabilizing system improves the stability of aseptic RTD cocoa-containing beverages by helping to avoid protein destabilization, phase separation, creaming, syneresis, viscosity changes, age gelation, and other phase separation/instability issues during the ambient storage of the beverage.

In a general embodiment, the present disclosure provides a liquid beverage including a protein component, a cocoa component, and a stabilizing system. The protein component may be a dairy protein such as whey protein, casein, or combinations thereof.

In another embodiment, the protein is selected from the group consisting of dairy-based proteins, plant-based proteins, animal-based proteins, artificial proteins, or combinations thereof. The dairy-based proteins may be selected from the group consisting of casein, casein hydrolysates, caseinates, whey, whey hydrolysates, milk protein concentrate, milk protein isolate, or combinations thereof. The skilled artisan will appreciate that the present disclosure is not restricted to dairy-based proteins from bovine origin, but pertains to dairy-based proteins from all mammalian animal species, such as from sheep, goats, horses, and camels. The plant-based proteins may be selected from the group consisting of soy protein, pea protein, canola protein, wheat and fractionated wheat proteins, corn proteins, zein proteins, rice proteins, oat proteins, potato proteins, peanut proteins, green pea powder, green bean powder, proteins derived from beans, lentils, and pulses, or combinations thereof.

Health benefits provided by proteins (and whey proteins in particular) include enhancement of muscle development and building, as well as muscle maintenance in children, adults or elderly people, enhancement of the immune function, improvement of cognitive function, control of blood glucose such that they are suitable for diabetics, weight management and satiety, anti-inflammatory effects, wound healing and skin repair, lowering of the blood pressure, etc.

Protein (and whey protein in particular) may also be used to mask the poor flavor profile of beneficial branched chain amino acids such as leucine, isoleucine and valine. In this manner, the high protein beverage of the present disclosure may provide functional nutrients to an individual while also being desirable for consumption by the individual.

In an embodiment, the beverage is a high-protein beverage. The protein component may be present in an amount from about 1% to about 25%, or from about 2% to about 20%, or from about 3% to about 15% by weight of the beverage. In an embodiment, the protein component is present in an amount from about 4% to about 12% by weight of the beverage.

The cocoa component can include one or more natural cocoas, alkalized cocoas, and/or other cocoa or chocolate based products. For example, cocoa powder may be present in an amount ranging from about 0.1% to about 5%, or about 0.25% to about 4% by weight of the beverage. In an embodiment, the beverage includes cocoa powder in an amount ranging from about 0.5% to about 2.85% by weight of the beverage.

The stabilizing system includes a hydrocolloid component and sodium hexamethaphosphate. It is known that hydrocolloids use hydrogen bonding to hold water around their base molecules. It is also known that carrageenans, which are hydrocolloids extracted from certain seaweeds, have a high protein reactivity. Specifically, kappa carrageenan is known to react well with the milk protein casein. Kappa carrageenan reacts with the casein micelles to form a loose three-dimensional gel network which assists in keeping insoluble particles suspended.

The use of kappa carrageenan for chocolate milk type products is well known. The amounts of kappa carrageenan used in such applications are typically very small, because the addition of too much kappa carrageenan results in a beverage with an unpleasantly high viscosity, or a gelled beverage. If too little kappa carrageenan is used, the gel network will not be strong enough to support the insoluble cocoa particles and the beverage with experience sedimentation and phase separation. Additionally, the loose gel network suspending the insoluble cocoa particles breaks down when exposed to high temperatures, such as during sterilizing heat treatment or ambient storage temperatures above 30° C. Thus, a more effective stabilizing system is needed.

It has surprisingly been found that the addition of sodium hexamethaphosphate to a stabilizing system including a hydrocolloid component at specific ranges and weight ratios significantly improves the physico-chemical stability of RTD chocolate beverages. For example, the specific combinations of these components provide stable, RTD chocolate beverages with a consistently low viscosity without phase separation during different storage conditions over an extended period of time. In addition, the unique combination of the stabilizing system was advantageously and unexpectedly found to provide a resulting beverage having an improved texture with a good mouthfeel, a smooth texture and a low viscosity, about 8 to about 15 cP at refrigeration temperature. One of skill in the art would appreciate that refrigeration temperature is commonly accepted to include temperatures ranging from about 0° C. to about 5° C., but that changes in certain other conditions (such as pressure) may cause values outside of this range to also be considered to be refrigeration temperature.

The weight ratio of the hydrocolloid component to the sodium hexamethaphosphate may be about 1:1 to about 30:1, or about 2:1 to about 25:1, or about 3.8:1 to 22.3:1. In an embodiment, the weight ratio of the hydrocolloid component to the sodium hexamethaphosphate is about 5.75:1 to 22.3:1.

The hydrocolloid component may be present in an amount from about 0.05% to about 0.40%, or from about 0.08% to about 0.36%, or from about 0.1% to 0.3% by weight of the beverage. In an embodiment, the hydrocolloid component is present in an amount from about 0.115% to about 0.335% by weight of the beverage.

The sodium hexamethaphosphate may be present in an amount from about 0.01% to 0.05%, or from about 0.013% to 0.04%, or from about 0.015% to 0.03% by weight of the beverage. In an embodiment, the sodium hexamethaphosphate is present in an amount from about 0.015% to 0.02% by weight of the beverage.

It has been found that at levels below about 0.015% by weight, the sodium hexamethaphosphate does not provide good beverage stability, and at levels above about 0.02% by weight, there was phase separation. Thus, the ratio between the specific amounts of the hydrocolloid component and the sodium hexamethaphosphate is important to achieve the desired beverage quality and stability characteristics.

The hydrocolloid component can include any suitable hydrocolloid, such as, for example, carrageenans (kappa, iota and lambda), agar-agar, gelatin, pectin, xanthan gum, gum arabic, guar gum, locust bean gum, cellulose derivatives as carboxymethyl cellulose and microcrystalline cellulose, alginate, starch, or combinations thereof.

In an embodiment, the hydrocolloid component includes a cellulose component and a carrageenan component. The hydrocolloid component may also have a cellulose component, the cellulose component including microcrystalline cellulose and carboxymethyl cellulose. The weight ratio of the microcrystalline cellulose to carboxymethyl cellulose may be about 40:1 to about 2:1, or about 35:1 to about 3:1. In an embodiment, the weight ratio of the microcrystalline cellulose to carboxymethyl cellulose is about 30:1 to about 4:1.

The carrageenan component can be kappa carrageenan, lambda carrageenan, iota carrageenan, or combinations thereof. In a further embodiment, the carrageenan component is kappa carageenan.

Microcrystalline cellulose may be present in an amount from about 0.05% to about 0.30%, or from about 0.075% to about 0.350%, or from about 0.1% to about 0.3% by weight of the beverage, or from about 0.05% to about 0.2%.

Carboxymethyl cellulose may be present in an amount from about 0.0005% to about 0.0300%, or from about 0.0075% to about 0.0275%, or from about 0.01% to about 0.025% by weight of the beverage.

Kappa carrageenan may be present in an amount from about 0.003% to about 0.03%, or from about 0.004% to about 0.02%, or from about 0.005% to about 0.01% by weight of the beverage.

In an embodiment, the stabilizing system includes: (a) microcrystalline cellulose present in an amount from about 0.1% to about 0.3% by weight of the beverage, (b) carboxymethyl cellulose present in an amount from about 0.01% to about 0.025% by weight of the beverage, and (c) kappa carrageenan present in an amount from about 0.005% to about 0.01% by weight of the beverage.

As discussed above, the hydrocolloid component can assist in maintaining good suspension and emulsion stability, avoiding syneresis and other phase separation issues during the storage, and improving mouthfeel. The addition of sodium hexamethaphosphate has surprisingly been found to improve the stabilization characteristics of the hydrocolloid component, resulting in a beverage which may undergo heat treatment and ambient storage for at least 9 months at 4° C., 20° C. and 30° C., and/or 1 month at 38° C. without the typical destabilization effects of a hydrocolloid component not including sodium hexamethaphosphate, as discussed in the below example.

Thus, the chocolate beverage can be made aseptic to extend product shelf life. The stabilizing system can maintain the aseptic chocolate beverage with a low viscosity at about refrigeration temperature, even after heat treatment and/or and elevated storage temperatures. The stabilizing system causes improved stability of the cocoa in suspension while also preventing or minimizing other phase separation issues. Additionally, the unique stabilizing system improves the body and texture of the beverage, provides a better mouthfeel, and maintains a low viscosity, similar to that of reconstituted powder in milk, throughout the shelf-life of the beverage.

The chocolate beverages may also include one or more ingredients such as flavors, sweeteners, colorants, or combinations thereof. Sweeteners can include, for example, sucrose, sucralose, acesulfame K, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination.

Usage level of the flavors, sweeteners and colorants will vary greatly and will depend on such factors as potency of the sweetener, desired sweetness of the beverage, the level and type of flavor used, and cost considerations. Any suitable combinations of sugar and/or sugarless sweeteners may be used in the chocolate beverages. For example, sugar may be present in the chocolate beverage at a concentration ranging from about 0.5% to about 7% by weight. Sugar may be present in the chocolate beverage at a concentration ranging from about 1% to about 5% by weight. In an embodiment, sugar is present in the chocolate beverage at a concentration ranging from about 1.75% to about 3% by weight.

Non-limiting examples of suitable flavors include chocolate enhancers, cream/dairy enhancers, vanilla flavors, or combinations thereof. The chocolate beverage may also include malt or malt extract. For example, malt extract may be present in an amount from about 0.5% to about 7% by weight of the beverage, or in an amount from about 0.75% to about 6% by weight of the beverage, or in an amount of about 3% to about 4.5% by weight of the beverage. In one embodiment, malt extract is present in an amount from about 1% to about 4.5% by weight of the beverage.

The beverage may further include one or more vitamins and/or minerals. The vitamins include, but are not limited to, vitamin A, vitamin $B_1$ (thiamine), vitamin $B_2$ (riboflavin), vitamin $B_3$ (niacin or niacinamide), vitamin $B_5$ (pantothenic acid), vitamin $B_6$ (pyridoxine, pyridoxal, or pyridoxamine, or pyridoxine hydrochloride), vitamin $B_7$ (biotin), vitamin $B_9$ (folic acid), and vitamin $B_{12}$ (various cobalamins; commonly cyanocobalamin in vitamin supplements), vitamin C, vitamin D, vitamin E, vitamin K, folic acid, biotin, choline, or combinations thereof.

Non-limiting examples of the minerals include calcium, magnesium, iron or a combination thereof. The source of calcium can include calcium carbonate, calcium phosphate, calcium citrate, other insoluble calcium compounds or a combination thereof. The source of magnesium can include magnesium phosphate, magnesium carbonate, magnesium hydroxide or combination of thereof. The source of iron can include iron ammonium phosphate, ferric pyrophosphate, ferric phosphate, ferrous phosphate, other insoluble iron compounds, aminoacids, iron chelating compounds such as EDTA, or combinations thereof. The minerals may also include any of boron, calcium, chromium, copper, iodine, iron, magnesium, manganese, molybdenum, nickel, phosphorus, potassium, selenium, silicon, tin, vanadium, zinc, or combinations thereof.

The chocolate beverage may further include an amino acid selected from the group consisting of alanine, arginine, asparagine, aspartate, citrulline, cysteine, glutamate, glutamine, glycine, histidine, hydroxyproline, hydroxyserine, hydroxytyrosine, hydroxylysine, isoleucine, leucine, lysine, methionine, phenylalanine, proline, serine, taurine, threonine, tryptophan, tyrosine, valine, or combinations thereof.

The chocolate beverage may further include fiber or a source of fiber. The fiber may be a prebiotic selected from the group consisting of acacia gum, alpha glucan, arabinogalactans, beta glucan, dextrans, fructooligosaccharides, fucosyllactose, galactooligosaccharides, galactomannans, gentiooligosaccharides, glucooligosaccharides, guar gum, inulin, isomaltooligosaccharides, lactoneotetraose, lactosucrose, lactulose, levan, maltodextrins, milk oligosaccharides, partially hydrolyzed guar gum, pecticoligosaccharides, resistant starches, retrograded starch, sialooligosaccharides, sialyllactose, soyoligosaccharides, sugar alcohols, xylooligosaccharides, their hydro lysates, or combinations thereof.

The chocolate beverage may also include a probiotic selected from the group consisting of probiotics including *Aerococcus, Aspergillus, Bacteroides, Bifidobacterium, Candida, Clostridium, Debaromyces, Enterococcus, Fusobacterium, Lactobacillus, Lactococcus, Leuconostoc, Melissococcus, Micrococcus, Mucor, Oenococcus, Pediococcus, Penicillium, Peptostrepococcus, Pichia, Propionibacterium, Pseudocatenulatum, Rhizopus, Saccharomyces, Staphylococcus, Streptococcus, Torulopsis, Weissella*, or combinations thereof.

The chocolate beverage may also include an antioxidant selected from the group consisting of carotenoids, coenzyme Q10 ("CoQ10"), flavonoids, glutathione Goji (wolfberry), hesperidine, lactowolfberry, lignan, lutein, lycopene, polyphenols, selenium, vitamin A, vitamin $B_1$, vitamin $B_6$, vitamin $B_{12}$, vitamin C, vitamin D, vitamin E, or combinations thereof.

The process of making the beverages may include dissolution and/or hydration (wetting) of the components in fluid, UHT heat treatment, followed by aseptic homogenization and aseptic filling according to known methods.

EXAMPLE

By way of example and not limitation, the following example is illustrative of an embodiment of the present disclosure.

Example 1

A beverage was made including the ingredients specified below in Table 1. The ingredients were included within the specified ranges. The beverage was subjected to a standard high temperature heat treatment (such as UHT sterilization). The aseptic beverage was stored for a period of 9 months at each of 4° C., 20° C., 30° C., as well as 1 month at 38° C.

TABLE 1

Range of Ingredients for Good Stabilization/Texturization

| Ingredient | Range of % by weight of total beverage |
| --- | --- |
| Dairy Proteins | 4 to 12% |
| Cocoa Powder | 0.50 to 2.85% |
| Malt Extract | 1.0 to 4.5% |
| Sugar | 1.75 to 3.00% |
| Microcrystalline Cellulose | 0.10 to 0.0.30% |
| Carboxymethyl Cellulose | 0.010 to 0.025% |
| K-Carrageenan | 0.005 to 0.010% |
| Sodium Hexamethaphosphate | 0.015 to 0.030% |

The beverage including the unique stabilizing system survived the heat treatment with no protein destabilization, which may lead to syneresis or coagulation. Following the 1 month storage period, the beverage experienced no phase separation, no sedimentation, and no viscosity changes. It was found that the chocolate drink had a good appearance, mouth-feel, smooth texture low viscosity and a good flavor.

Following each of the 9 month storage periods, the beverage was physically stable with an acceptable flavor profile.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A shelf-stable ready to drink beverage comprising:
    a protein component present in an amount from about 4% to about 12% by weight of the beverage;
    a cocoa component; and
    a stabilizing system comprising (i) sodium hexametaphosphate in an amount from about 0.015% to about 0.03% by weight of the beverage and (ii) a hydrocolloid component comprising a cellulose component and a carrageenan component, wherein the hydrocolloid component is about 0.115% to about 0.335% by weight of the beverage.

2. The shelf-stable ready to drink beverage of claim 1, wherein a viscosity of the beverage ranges from about 8 to about 15 cP at about a refrigeration temperature.

3. The shelf-stable ready to drink beverage of claim 1, wherein a weight ratio of the hydrocolloid component to the sodium hexametaphosphate is about 3.8:1 to 22.3:1.

4. The shelf-stable ready to drink beverage of claim 1, wherein the cellulose component is selected from the group consisting of microcrystalline cellulose, carboxymethyl cellulose, and combinations thereof.

5. The shelf-stable ready to drink beverage of claim 1, wherein the carrageenan component is selected from the group consisting of kappa carrageenan, lambda carrageenan, iota carrageenan, and combinations thereof.

6. The shelf-stable ready to drink beverage of claim 4, wherein the cellulose component comprises microcrystalline cellulose and carboxymethyl cellulose, and a weight ratio of the microcrystalline cellulose to the carboxymethyl cellulose is about 30:1 to about 4:1.

7. The shelf-stable ready to drink beverage of claim 1, wherein the carrageenan component is present in an amount from about 0.005% to about 0.01% by weight of the beverage.

8. The shelf-stable ready to drink beverage of claim 1, wherein the beverage comprises malt extract.

9. A method for making a high-protein shelf-stable ready to drink beverage, the method comprising:

mixing a protein component, a cocoa component, and a stabilizing system comprising (i) sodium hexametaphosphate in an amount from about 0.015% to about 0.03% by weight of the beverage and (ii) a hydrocolloid component comprising a cellulose component and a carrageenan component, wherein the protein component is about 4% to about 12% by weight of the beverage, and the hydrocolloid component is about 0.115% to about 0.335% by weight of the beverage, and wherein the stabilizing system is formulated to maintain a viscosity of the beverage in a range from about 8 to about 15 cP at about a refrigeration temperature and to prevent sedimentation and other phase separation during storage.

10. The method of claim 9, wherein the cellulose component is selected from the group consisting of microcrystalline cellulose, carboxymethyl cellulose, and combinations thereof.

* * * * *